United States Patent
Xia et al.

(10) Patent No.: US 12,515,940 B2
(45) Date of Patent: Jan. 6, 2026

(54) MICRO-ELECTROMECHANICAL SYSTEM DEVICE AND METHOD OF FORMING THE SAME

(71) Applicant: Vanguard International Semiconductor Corporation, Hsinchu (TW)

(72) Inventors: Jia Jie Xia, Singapore (SG); Rakesh Kumar, Singapore (SG)

(73) Assignee: Vanguard International Semiconductor Corporation, Hsinchu (TW)

( * ) Notice: Subject to any disclaimer, the term of this patent is extended or adjusted under 35 U.S.C. 154(b) by 204 days.

(21) Appl. No.: 16/937,574

(22) Filed: Jul. 23, 2020

(65) Prior Publication Data
US 2022/0024754 A1    Jan. 27, 2022

(51) Int. Cl.
*B81B 3/00* (2006.01)
*G01P 15/08* (2006.01)

(52) U.S. Cl.
CPC ............ *B81B 3/0021* (2013.01); *G01P 15/08* (2013.01); *B81C 2203/03* (2013.01); *G01P 2015/0817* (2013.01)

(58) Field of Classification Search
CPC .......... B81B 3/0021; B81B 2201/0235; G01P 15/08; G01P 2015/0817; G01P 15/0802; G01P 15/097; B81C 2203/03; B81C 1/00182; H04R 7/26; H04R 19/005; H04R 7/06; H04R 19/04
See application file for complete search history.

(56) References Cited

U.S. PATENT DOCUMENTS

| | | | |
|---|---|---|---|
| 7,849,745 B2 | 12/2010 | Wang et al. | |
| 10,554,153 B2 | 2/2020 | Chatterjee | |
| 2002/0118850 A1* | 8/2002 | Yeh | B81B 3/0072 381/313 |
| 2002/0127760 A1* | 9/2002 | Yeh | B81C 1/00182 438/48 |

(Continued)

FOREIGN PATENT DOCUMENTS

| | | |
|---|---|---|
| CN | 101858928 A | 10/2010 |
| CN | 106915722 A | 7/2017 |

(Continued)

OTHER PUBLICATIONS

Zou,Highly symmetric tri-axis piezoelectric bimorph accelerometer,2004.

*Primary Examiner* — Steven B Gauthier
*Assistant Examiner* — Sun Mi Kim King
(74) *Attorney, Agent, or Firm* — Winston Hsu (57) ABSTRACT

The present disclosure relates to a micro-electromechanical system (MEMS) device and a method of forming the same. The MEMS device includes a substrate, a cavity, an interconnection structure and a proof mass. The substrate includes a first surface and a second surface opposite to the first surface. The cavity is disposed in the substrate, extending between the first surface and the second surface. The interconnection structure is disposed on the first surface of the substrate, over the cavity. The proof mass is disposed in the cavity, connected to the interconnection structure, the proof mass having a thickness which is smaller than a thickness of the substrate.

7 Claims, 8 Drawing Sheets

(56) References Cited

U.S. PATENT DOCUMENTS

| | | | |
|---|---|---|---|
| 2013/0127295 A1* | 5/2013 | Jun | H10N 30/306 |
| | | | 977/948 |
| 2014/0206123 A1* | 7/2014 | Chu | B81C 1/00039 |
| | | | 438/51 |
| 2017/0366107 A1* | 12/2017 | Chatterjee | H02N 2/22 |

FOREIGN PATENT DOCUMENTS

| | | | | |
|---|---|---|---|---|
| CN | 110577185 A | * | 12/2019 | B81B 3/0021 |
| CN | 110631685 A | | 12/2019 | |
| TW | 201911887 A | | 3/2019 | |

* cited by examiner

MICRO-ELECTROMECHANICAL SYSTEM DEVICE AND METHOD OF FORMING THE SAME

BACKGROUND OF THE INVENTION

1. Field of the Invention

The present disclosure relates to a micro-electromechanical system (MEMS) device and a method of forming the same, and more particularly, to a MEMS device for acoustic application and a method of forming the same.

2. Description of the Prior Art

A micro-electromechanical system (MEMS) device is a microscopic device that is fabricated through general semiconductor processes, such as depositing or selective etching material layers. The microscopic devices include both the electronic and mechanical function which is operated based on, for instance, electromagnetic, electrostrictive, thermoelectric, piezoelectric, or piezoresistive effects. Therefore, MEMS structures are often applied to microelectronics such as accelerometer, gyroscope, mirror, and acoustic sensor, etc.

Recently, MEMS accelerometer products bring a new dimension to acoustic transducers, due to the fast development of true wireless stereo (TWS) earphone, and which is used for sensing the vibration of voices. The MEMS accelerometer products deployed in TWS earphones allows the TWS earphones to attractively pick-up voice even when high noise or wind noise are presented in the surrounding environment. However, currently design of MEMS accelerometer product is mainly thick and large, so as to be applied on mobile phone generally, which could not meet the minimized requirement of the TWS earphones. Thus, a new accelerometer design is needed for acoustic application.

SUMMARY OF THE INVENTION

The present disclosure provides a micro-electromechanical system (MEMS) device and a method of forming the same, in which the MEMS device includes a minimized proof mass having a relative smaller thickness than that of the substrate. The MEMS device of the present disclosure enables to be used on TWS earphones, for supplying the voice vibration of microphones.

An embodiment of the present disclosure provides a MEMS device including a substrate, a cavity, an interconnection structure and a proof mass. The substrate includes a first surface and a second surface opposite to the first surface. The cavity is disposed in the substrate, extending between the first surface and the second surface. The interconnection structure is disposed on the first surface of the substrate, over the cavity. The proof mass is disposed in the cavity, connected to the interconnection structure, the proof mass having a thickness which is smaller than a thickness of the substrate.

Another embodiment of the present disclosure provides a method of forming a MEMS device including the following steps. Firstly, a substrate is provided, and the substrate includes a first surface and a second surface opposite to the first surface. Next, a cavity extending between the first surface and the second surface is formed in the substrate, and an interconnection structure is formed on the first surface of the substrate, over the cavity. Then, a proof mass is formed in the cavity, wherein, the proof mass is connected to the interconnection structure and has a thickness which is smaller than a thickness of the substrate.

These and other objectives of the present invention will no doubt become obvious to those of ordinary skill in the art after reading the following detailed description of the preferred embodiment that is illustrated in the various figures and drawings.

DETAILED DESCRIPTION

For better understanding of the presented disclosure, preferred embodiments will be described in detail. The preferred embodiments of the present disclosure are illustrated in the accompanying drawings with numbered elements.

In the present disclosure, the formation of a first feature over or on a second feature in the description may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Furthermore, spatially relative terms, such as "beneath," "below," "lower," "over," "above," "upper" and the like, may be used herein for ease of description to describe one element or feature's relationship to another element (s) or feature(s) as illustrated in the figures. The spatially relative terms are intended to encompass different orientations of the device in use or operation in addition to the orientation depicted in the figures. For example, if the device in the figures is turned over, elements described as "below" and/or "beneath" other elements or features would then be oriented "above" and/or "over" the other elements or features. The apparatus may be otherwise oriented (rotated 90 degrees or at other orientations) and the spatially relative descriptors used herein may likewise be interpreted accordingly.

It is understood that, although the terms first, second, third, etc. may be used herein to describe various elements, components, regions, layers and/or sections, these elements, components, regions, layers and/or sections should not be limited by these terms. These terms may be only used to distinguish one element, component, region, layer and/or section from another region, layer and/or section. Terms such as "first," "second," and other numerical terms when used herein do not imply a sequence or order unless clearly indicated by the context. Thus, a first element, component, region, layer and/or section discussed below could be termed a second element, component, region, layer and/or section without departing from the teachings of the embodiments.

As disclosed herein, the term "about" or "substantial" generally means within 20%, preferably within 10%, and more preferably within 5%, 3%, 2%, 1%, or 0.5% of a given value or range. Unless otherwise expressly specified, all of the numerical ranges, amounts, values and percentages disclosed herein should be understood as modified in all instances by the term "about" or "substantial". Accordingly, unless indicated to the contrary, the numerical parameters set forth in the present disclosure and attached claims are approximations that can vary as desired.

Figure 1:
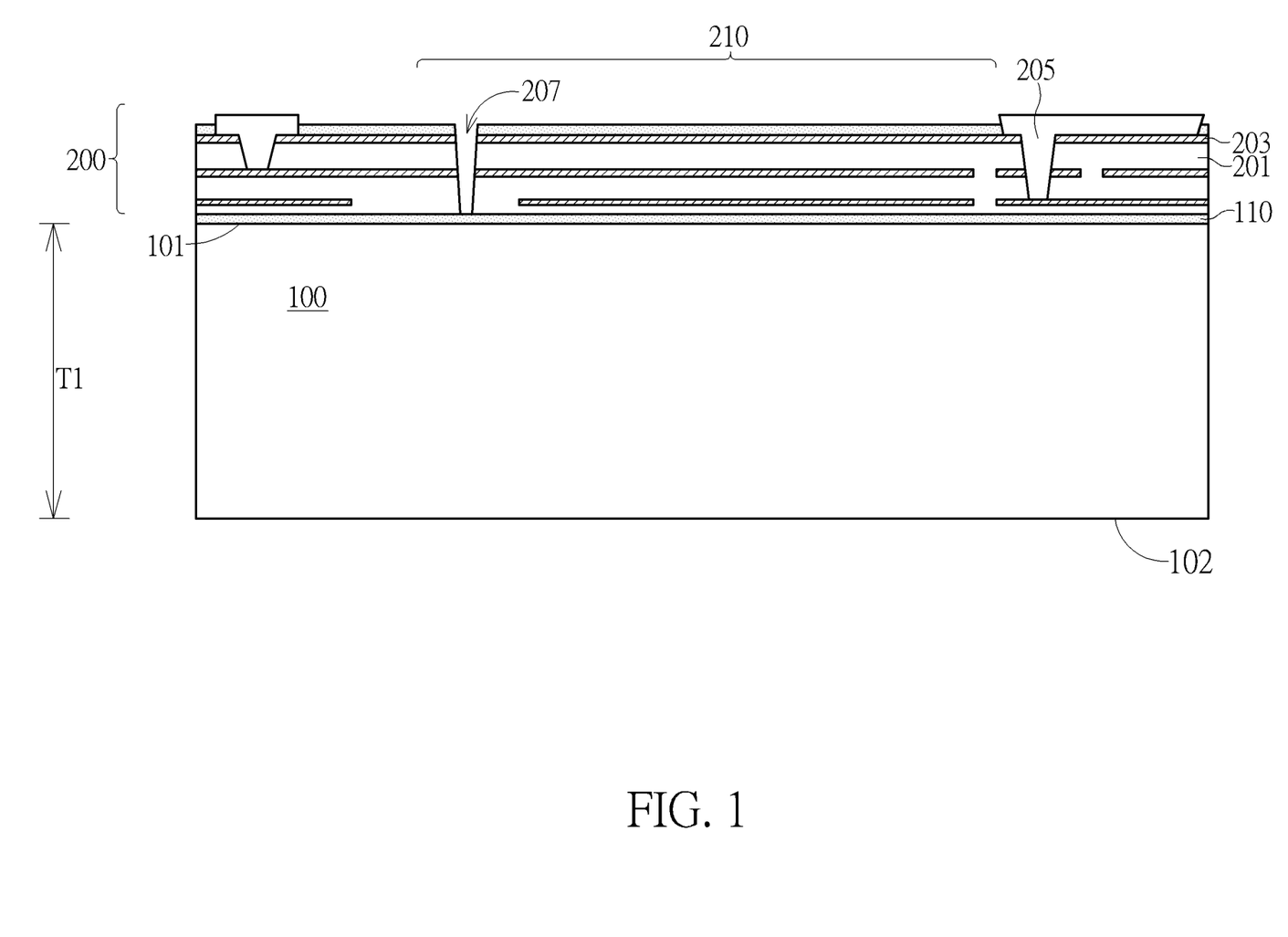
FIG. 1 is a schematic diagram illustrating a cross-sectional view of a MEMS device after forming interconnection structure.

Please refer to FIGS. 1-5, which illustrate a fabricating process of a MEMS device according to a first embodiment of the present disclosure. Firstly, as shown in FIG. 1, a substrate 100 such as a bulk silicon substrate is provided, and the substrate 100 for example includes single-crystalline silicon, polysilicon, amorphous silicon, or other suitable material. In one embodiment, a thickness T1 of the substrate 100 may be about 400-500 micrometers (μm), but not limited thereto. The substrate 100 has two surfaces opposite to each other, such as a first surface 101 and a second surface 102 as shown in FIG. 1, and an oxide layer 110 and an interconnection structure 200 are sequentially formed on the first surface 101 of the substrate 100. The oxide layer 110 for example include silicon oxide (SiO) or silicon dioxide (SiO$_2$), and the interconnection structure 200 may be any suitable semiconductor device being formed through general semiconductor processes such as depositing and/or selectivity etching material layers. In one embodiment, the interconnection structure 200 includes at least one dielectric layer 201 (for example including a dielectric material like silicon nitride, aluminum nitride, or silicon oxynitride) stacked on the first surface 101, at least one metal layer 203 (for example including a metal material like copper, molybdenum, tungsten or aluminum) embedded in the at least one dielectric layer, and at least one conductive pad 205 electrically connected the at least one metal layer 203, as shown in FIG. 1, but not limited thereto.

It is noted that the interconnection structure 200 further includes a penetrating hole 207 in the interconnection structure 200 within a suspended region 210, so that, a structure disposed within the suspended region 210 may be partially disconnected with the substrate 100 in a subsequent process to form a suspended structure (not shown in the drawings). The suspended structure for example include a top electrode (not shown in the drawings), a piezoelectric layer (not shown in the drawings) and a bottom electrode (not shown in the drawings) stacked from top to bottom in the interconnection structure 200, so as to be capable of vibrating at a certain frequency during the subsequent process. In the present embodiment, the suspended structure may include a cantilever, a diaphragm or the like, but not limited thereto.

Figure 2:
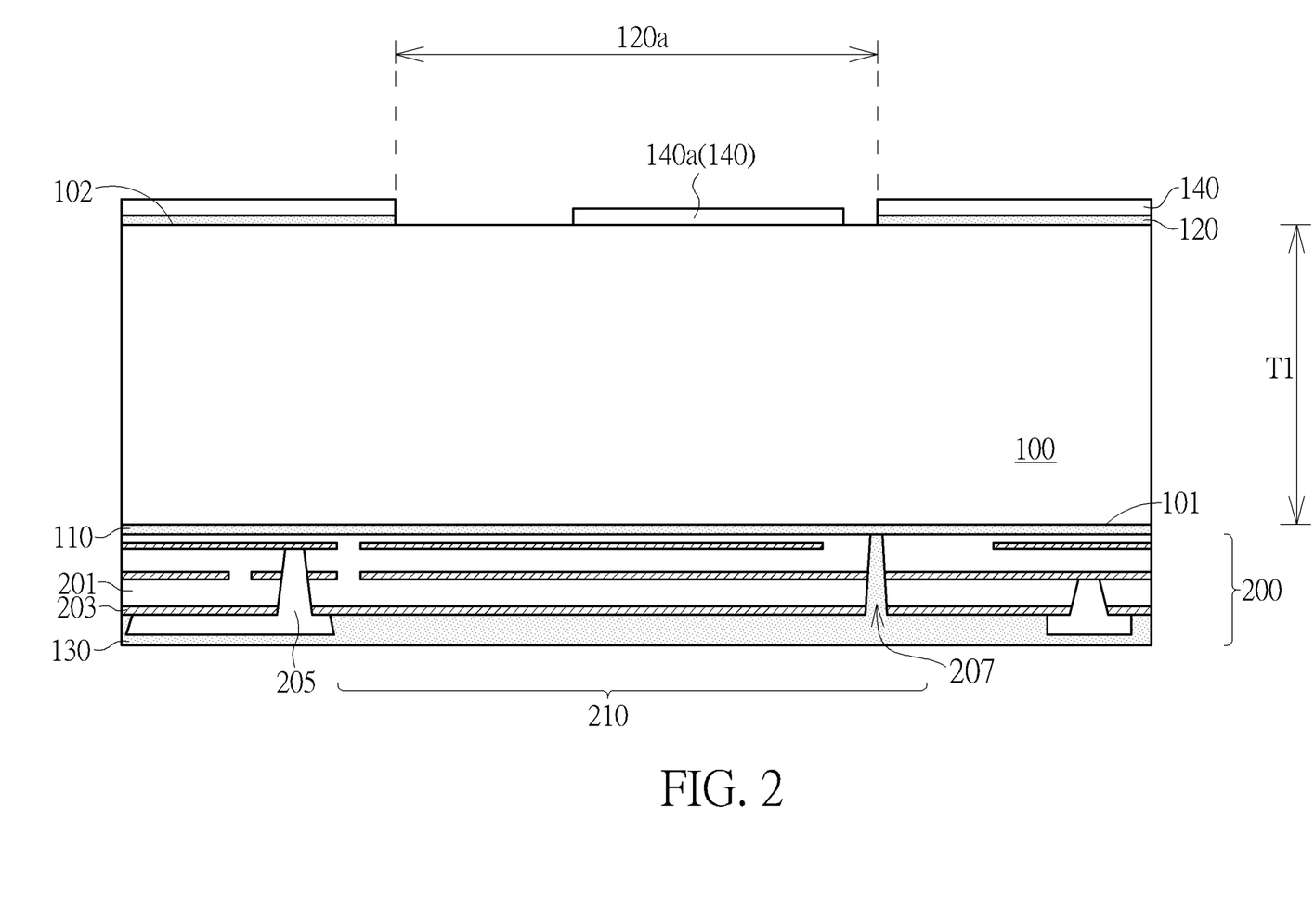
FIG. 2 is a schematic diagram illustrating a cross-sectional view of a MEMS device after forming mask layers.

Next, a protection layer 130 for example including silicon oxide or silicon dioxide is formed on a top surface the interconnection structure 200 for protecting the elements disposed in the interconnection structure 200, and a first mask layer 120 and a second mask layer 140 are sequentially formed on the second surface 102 of the substrate 100, as shown in FIG. 2, for defining a cavity and a proof mass respectively in the subsequent processes. Precisely, the first mask layer 120 has an opening 120a which is corresponding to the suspended region 210 of the interconnection structure 200 on the first surface 101, so that, a portion of the second surface 102 which is corresponded to the suspended region 210 is exposed from the opening 120a, as shown FIG. 2. In one embodiment, a dimension or a diameter of the opening 120a is, but not limited to, about 100-150 μm. The second mask layer 140 is stacked on the first mask layer 120 and further includes a pattern 140a within the opening 120a. In other words, a portion of the second mask layer 140 is disposed directly on the first mask layer 120 to completely overlap top surfaces of the first mask layer 120, and another portion of the second mask layer 140 is disposed on the exposed portion of the second surface 102, as shown In FIG. 2. In the present embodiment, the material of the first mask layer 120 preferably includes different etching selectivity related to the material of the second mask layer 140, for example, the first mask layer 120 may include silicon oxide and the second mask layer 140 may include a photoresist material, but not limited thereto. Also, the material of the first mask layer 120 preferably the same as that of the oxide layer 110, or the materials of the first mask layer 120 and the oxide layer 110 are preferably with the same etching selectivity.

Figure 3:
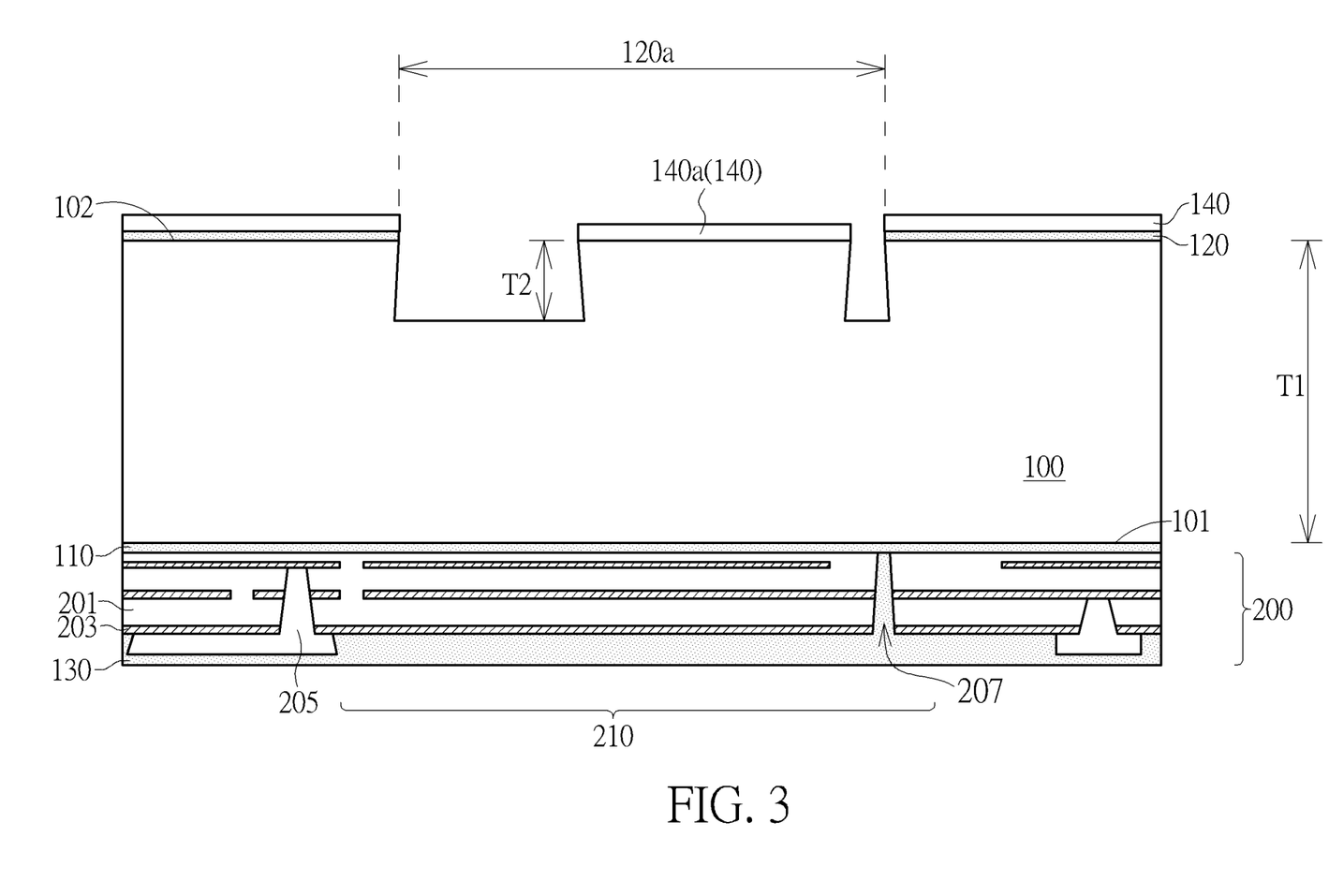
FIG. 3 is a schematic diagram illustrating a cross-sectional view of a MEMS device after performing an etching process.

As shown in FIG. 3, an etching process such as an anisotropic dry etching process is performed on a backside of the substrate 100, namely the side of the second surface 102, to remove a portion of the substrate 100 exposed from both of the second mask layer 140 and the first mask layer 120 to reach a certain depth. It is noted that, due to the coverage of the second mask layer 140, the substrate 100 covered by the pattern 140a is not removed during the etching process, so as to form a partially protruded profile as shown in FIG. 3, within the opening 120a. Preferably, the certain depth of the removed portion is substantially equal to a predetermined thickness of a proof mass formed subsequently. In one embodiment, the certain depth of the removed portion may be about 50-100 μm, and the protruded profile as shown in FIG. 3 may therefore have a thickness T2 about 50-100 μm, but not limited thereto. One of ordinary skill in the art would easily understand that, the thickness of the certain depth in the aforementioned etching process may be further adjustable according to the required thickness of the proof mass formed subsequently, and which is not limited to the aforementioned number.

Figure 4:
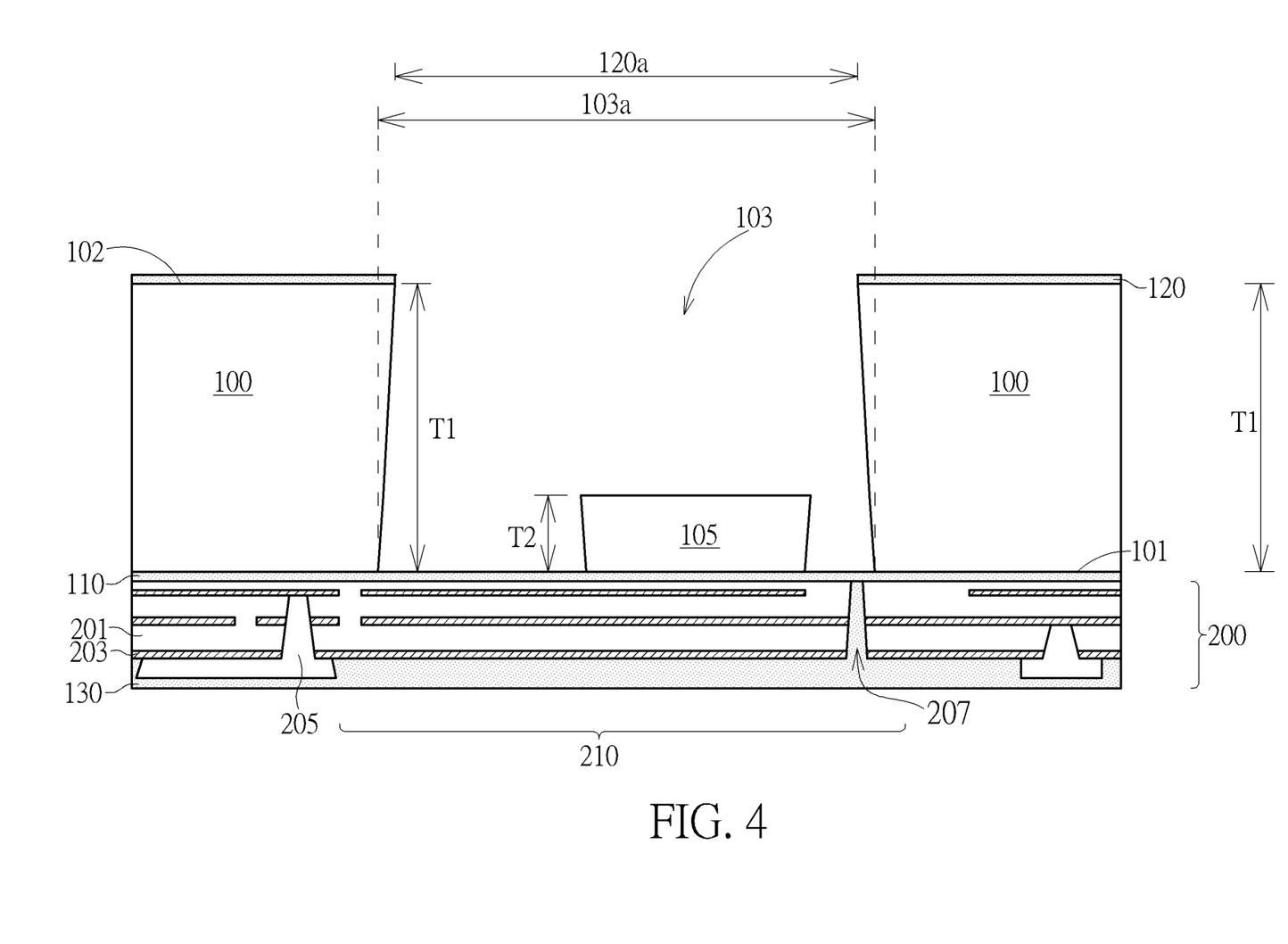
FIG. 4 is a schematic diagram illustrating a cross-sectional view of a MEMS device after performing another etching process.

Then, as shown in FIG. 4, the second mask layer 140 is removed, and another etching process such as an anisotropic dry etching process is performed also on the backside (the side of second surface 102) of the substrate 100, to further remove the substrate 100 through the partially protruded profile till exposing the oxide layer 110 underneath. Accordingly, a cavity 103 extending between the two surfaces (the first surface 101 and the second surface 102) of the substrate 100 is formed through the substrate 100, to have a depth the same as the thickness T1 of the substrate 100, and also, a proof mass 105 is formed within the cavity 103 due to the partially protruded profile. In this way, the cavity 103 and the proof mass 105 are formed simultaneously, both corresponding to the suspended region 210 of the interconnection structure 200 on the first surface 101, as shown in FIG. 4. The proof mass 105 includes a thickness T2 being about 50-100 μm, and the cavity 103 includes an opening 103a adjacent to a bottom surface of the suspended region 210.

Figure 5:
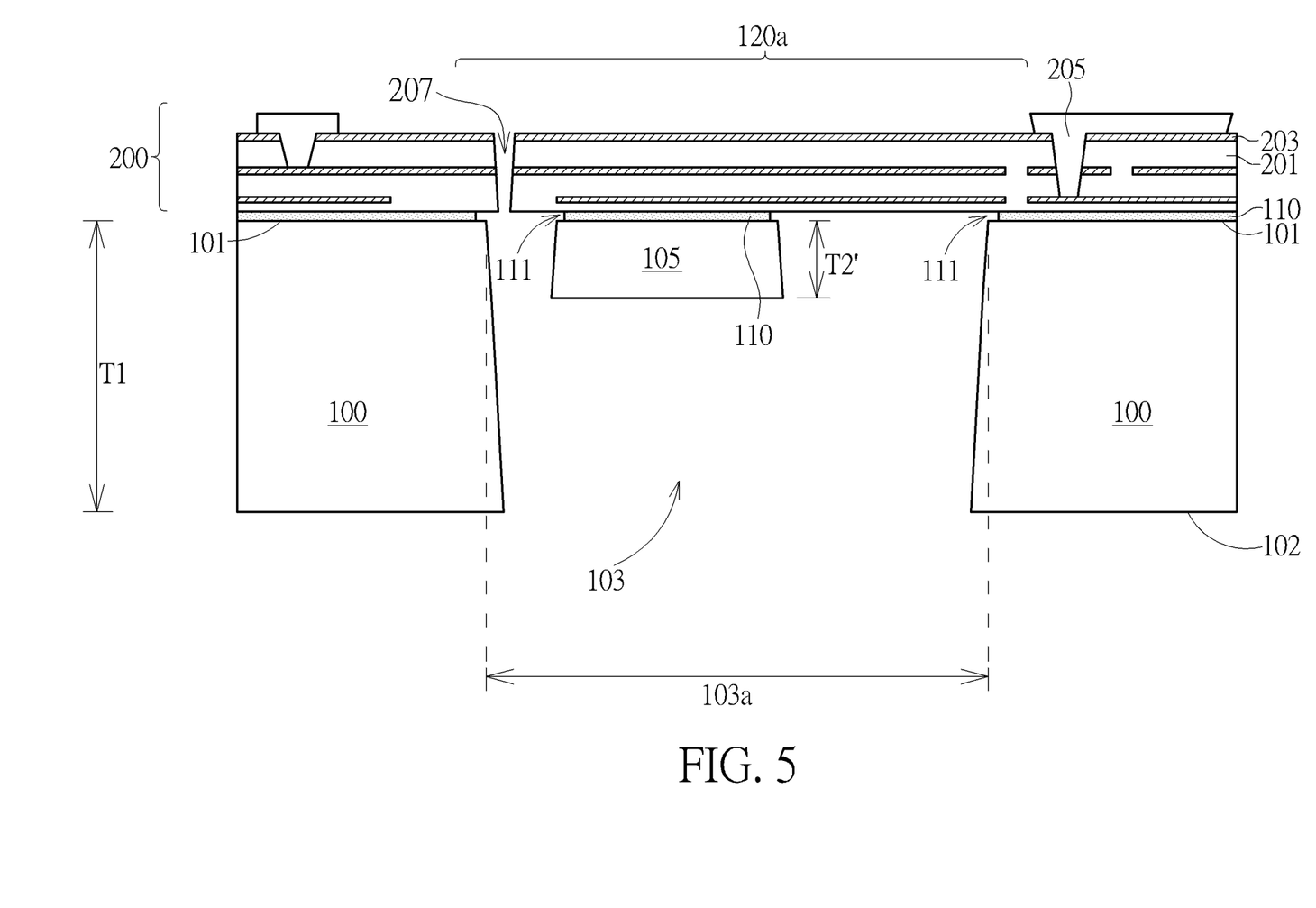
FIG. 5 is a schematic diagram illustrating a cross-sectional view of a MEMS device after releasing the device.

Following these, another etching process is performed to completely remove the first mask layer 120 and the oxide layer 110 exposed from the substrate 100 and the proof mass 105 at the same time, by using the etching selectivity related to the material of proof mass 105 and the substrate 100. For example, the etching selectivity of both the first mask layer 120 and the oxide layer 110 related to the proof mass 105 and the substrate 100 may be greater than 10, such as 10-20. Then, the bottom surface of the suspended region 210 is partially exposed, and the cavity 103 may therefore expose the bottom surface of the suspended region 210, as shown in FIG. 5. In addition, the proof mass 105 may therefore be disposed on the bottom surface of the suspended region 210, and a portion of the oxide layer 110 is sandwiched between the suspended region 210 and the proof mass 105. It is noted that, during the process of removing the first mask layer 120 and the oxide layer 110, sidewalls of the remained oxide layer 110 may be slightly removed so as to form an undercut portion 111 thereby, as shown in FIG. 5. Furthermore, a top portion of the proof mass 105 may also be slightly removed while removing the mask layer 120 and the oxide layer 110, so that, the proof mass 105 may include a reduced thickness T2' after removing the first mask layer 120 and the oxide layer 110. Preferably, the reduced thickness T2' may be about 1-10% less than the original thickness T2, without seriously affecting the entire mass of the proof mass 105. Then, the protection layer 130 is further removed to release the suspended structure within the suspended region 210 of the interconnection structure 200, so that, one side of the suspended structure within the suspended region 210 may be disconnected with the substrate 100, as shown in FIG. 5. In one embodiment, the protection layer 130 may be simultaneously removed while removing the mask layer 120 and the oxide layer 110, but not limited thereto, and in another embodiment, the protection layer 130 may also be removed through another etching process after removing the mask layer 120 and the oxide layer 110.

Through above processes, a MEMS device according to the first embodiment of the present disclosure is accomplished. In the present embodiment, the MEMS device includes the suspended structure within the suspended region 210 the interconnection structure 200, the cavity 103 and the proof mass 105, so as to configured as a MEMS piezoelectric accelerometer device, with the piezoelectric layer within the suspended structure capable of vibrating when applying acoustic waves or electrical signals, and with the proof mass 105 capable of adjusting the suspended structure to have a resonant frequency that matches the required acoustic frequency range. It is noteworthy that the proof mass 105 of the present embodiment is formed from a portion of the substrate 100, so as to obtain the same material and a minimized size in comparison with the substrate 100. The thickness T2' of the proof mass 105 is much thinner than the thickness T1 of the substrate 100, for example being about ¼-⅛ of the thickness T1 of the substrate 100. Thus, the MEMS device with said minimized proof mass 105 in the present disclosure enables to be applied on TWS earphones, for supplying the voice vibration of microphones.

One of ordinary skill in the art would easily realize the MEMS device and the fabricating process thereof in the present disclosure is not limited to the aforementioned embodiment, and may further include other examples or variations. The following description will detail the different embodiments of the MEMS device and the fabricating process thereof in the present disclosure. To simplify the description, the following description will detail the dissimilarities among the different embodiments and the identical features will not be redundantly described. In order to compare the differences between the embodiments easily, the identical components in each of the following embodiments are marked with identical symbols.

According to another embodiment of the present disclosure, a MEMS device and a fabricating process thereof are provided to further improve the accuracy of cavity size, the accuracy of proof mass size, as well as the position of the proof mass within the cavity. Sometimes, the size or the dimension of cavity 103 may have obvious variation while forming the cavity 103 and the proof mass 105 as shown in FIG. 4 and FIG. 5, because a cavity with a deep depth, such as 300-350 μm, is formed in the substrate 100 by removing a portion of the substrate 100 directly from the second surface 102 during a single etching process. The cavity 103 formed thereby may include inclined sidewalls as shown in FIG. 4 and FIG. 5, and the inclined angle of the inclined sidewalls of the cavity 103 may lead to varied dimension of opening 103a. For example, if the inclined angle of the cavity 103 has a variation of 1 degree, the opening 103a of the cavity 103 on the first surface 101 of the substrate 100 may have a variation of 10 μm or more, which may result in poor sensitivity or poor sensor accuracy. On the other hand, the reduced thickness T2' of the proof mass 105 may also result in poor sensor accuracy sometimes. If the lost thickness of the proof mass thickness is varied or too serious, the minimum detectable signal of the MEMS device is also varied due to the formula (I) below. Under such situations, MEMS device obtained from the above fabricating process may suffer from variation impact of cavity size and the proof mass size, and which may not be industrial fabricated successfully.

$$a_{min} = \frac{\sqrt{4\kappa_B T \omega_0}}{m_i Q} \tag{I}$$

where $a_{min}$ being minimum detectable signal; $\kappa_B$ being Boltzmann's constant; T being absolute temperature; $\omega_0$ being resonance frequency; $m_i$ being sensor mass; and Q being quality factor.

Figure 6:
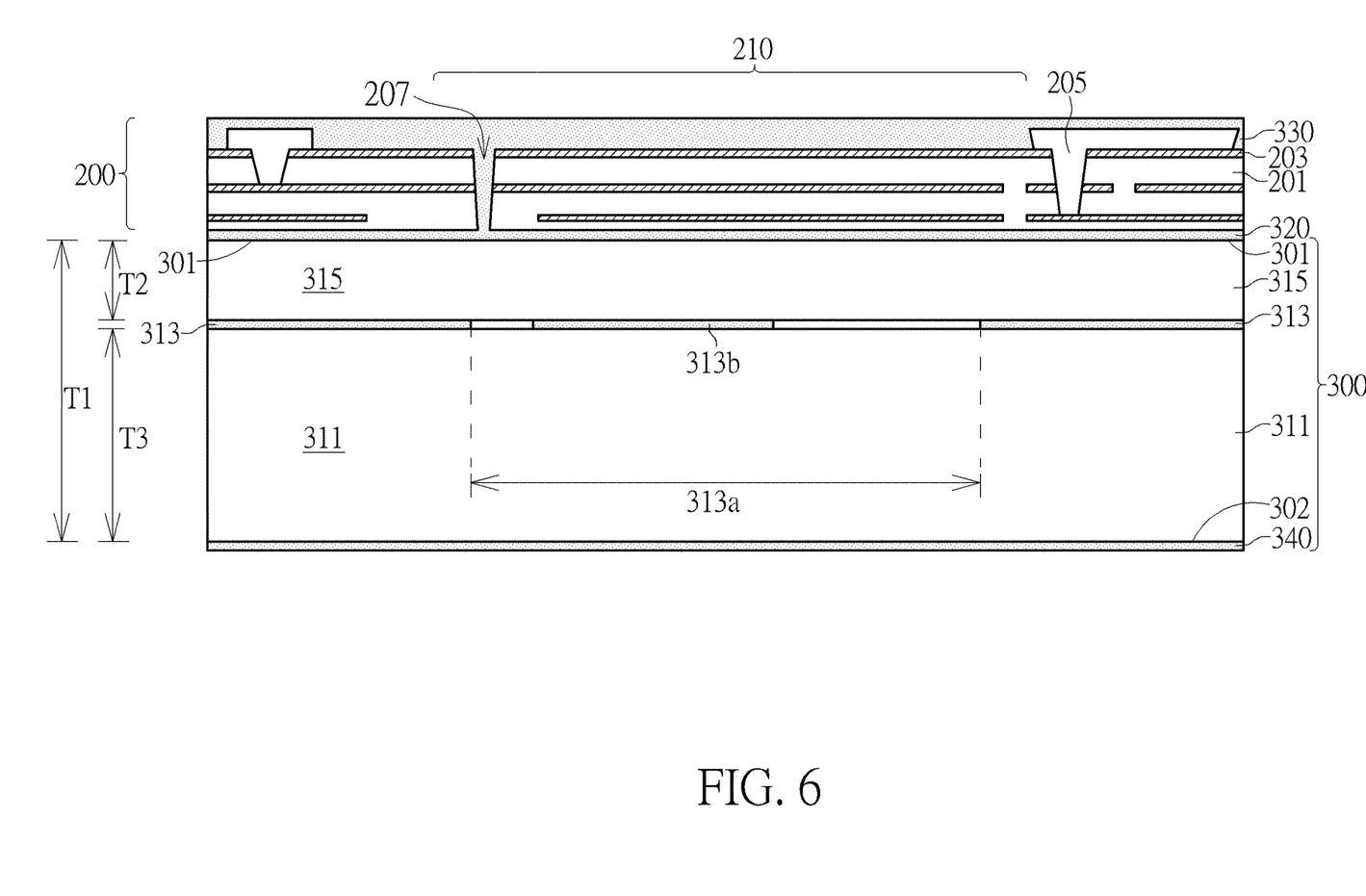
FIG. 6 is a schematic diagram illustrating a cross-sectional view of a MEMS device after forming interconnection structure.
Figure 7:
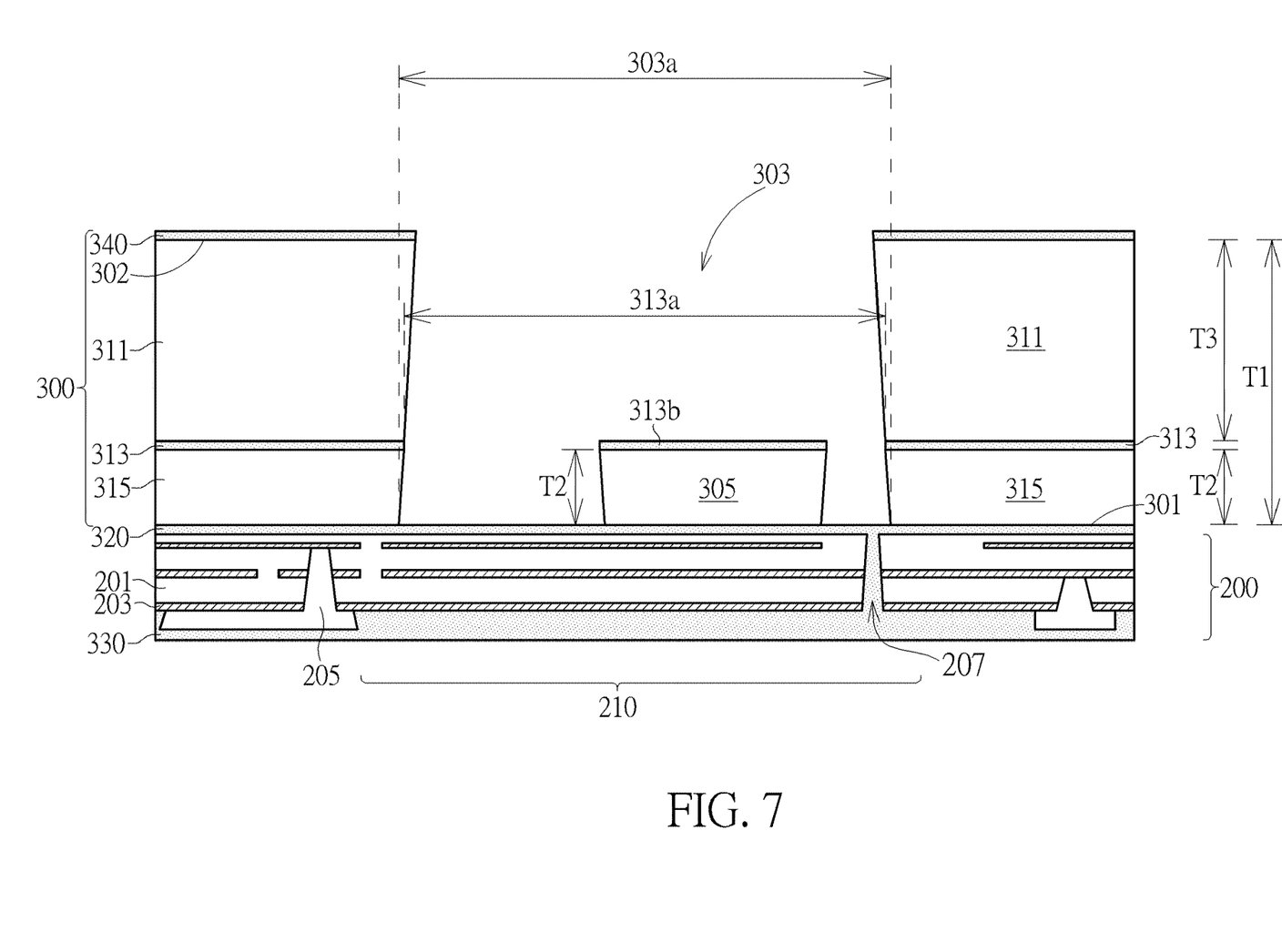
FIG. 7 is a schematic diagram illustrating a cross-sectional view of a MEMS device after performing an etching process.
Figure 8:
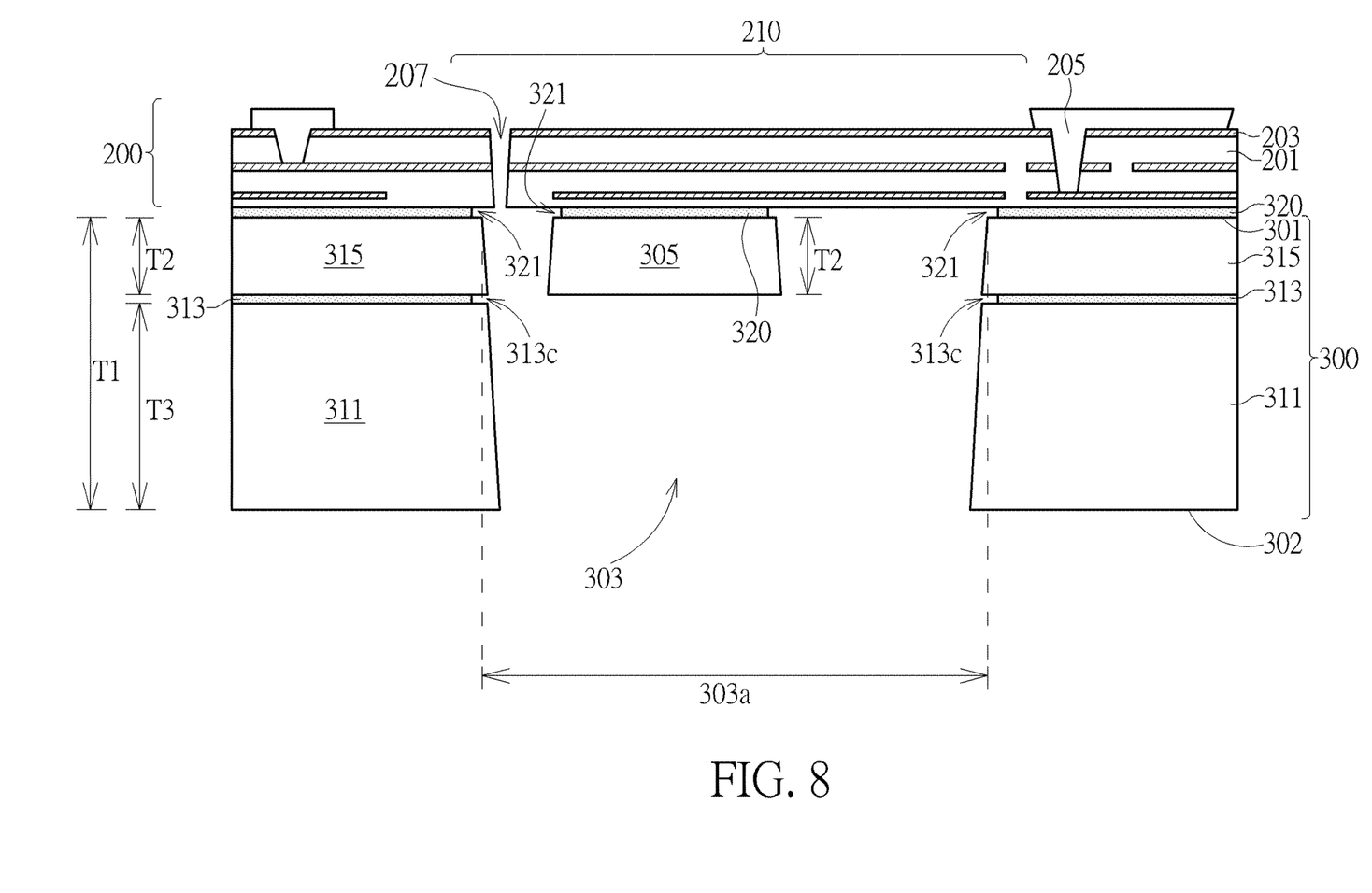
FIG. 8 is a schematic diagram illustrating a cross-sectional view of a MEMS device after releasing the device.

Please refer to FIGS. 6-8, which illustrate a fabricating process of a MEMS device according to a second embodiment of the present disclosure. The formal steps of the fabricating process in the present embodiment are substantially similar to those in the aforementioned first embodiment, and the similarity between the present embodiment and the aforementioned embodiment will not be redundant described hereinafter. The difference between the present embodiment and the aforementioned embodiment is mainly in that a silicon-on-insulator (SOI) substrate 300 is firstly provided for fabricating the MEMS device.

As shown in FIG. 6, the SOI substrate 300 is provided to further include a first semiconductor layer 311, with a material thereof being single-crystalline silicon, polysilicon, amorphous silicon or other suitable material for example, an insulating layer 313, with a material thereof being silicon oxide or silicon dioxide for example, and a second semiconductor layer 315, with a material thereof being single-crystalline silicon, polysilicon, amorphous silicon or other suitable material for example, and the first semiconductor layer 311, the insulating layer 313 and the second semiconductor layer 315 are sequentially stacked from bottom to top. Precisely speaking, the SOI substrate 300 also includes a thickness T1 being, but not limited to, about 400-500 μm, wherein, a thickness T3 of the first semiconductor layer 311 is, but not limited to, about 350-400 µm, and a thickness T2 of the second semiconductor layer 315 is, but not limited to, about 50-100 µm. In one embodiment, the SOI substrate 300 may be formed by oxidizing a surface of two semiconductor layers (not shown in the drawings) respectively, bonding the two semiconductor layers through the said oxidized surfaces, and thinning down one of the two semiconductor layer to a certain thickness, such as 50-100 µm (thickness T2), but is not limited thereto. Preferably, the thickness T2 of the semiconductor layer 315 is equal to a predetermined thickness of a proof mass formed subsequently, for example 50 µm, but not limited thereto. One of ordinary skill in the art would fully understand that, the thickness of the semiconductor layer 315 may also be further adjustable according to the required sensing accuracy of practical products.

Also, the SOI substrate 300 has two surfaces opposite to each other, such as a first surface 301 and a second surface 302 as shown in FIG. 6, and an oxide layer 320 and an interconnection structure 200 are sequentially formed on the first surface 301 of the SOI substrate 300. The oxide layer 320 preferably includes a material with the same etching selectivity related to that of the insulating layer 313, such as including silicon oxide or silicon dioxide, but not limited thereto. Also, the oxide layer 320 preferably includes the same thickness of the insulating layer 313. Then, a protection layer 330 for example also including silicon oxide or silicon dioxide is further formed on a top surface the interconnection structure 200 for protecting the elements disposed therein. It is noted that, the detailed features of the interconnection structure 200 of the present embodiment are substantially the same as those mentioned in the aforementioned first embodiment, and will not be redundant described hereinafter. It is also noted that, the insulating layer 313 of the SOI substrate 300 further includes an opening 313a and a pattern 313b, which are both corresponding to the suspended region 210 of the interconnection structure 200, as shown in FIG. 6. The opening 313a is used to define a cavity formed in the subsequent process, and which preferably includes a predetermined dimension of the cavity, such as being about 100-150 µm, but not limited thereto. The pattern 313b is disposed within the opening 313a, and which is used to define the forming position of the proof mass in the subsequent process. The pattern 313b preferably includes a predetermined dimension of the proof mass. In other words, the opening 120a of the first mask layer 120 and the pattern 140a of the second mask layer 140 for respectively defining the cavity 103 and the proof mass 105 in the aforementioned first embodiment are integrated into a single layer in the present embodiment, and the single layer is namely the insulating layer 313 of the SOI substrate 300. In addition, the mask layer for forming the cavity and the proof mass in the present embodiment is pre-made before forming any element (such as the interconnection structure 200 or the oxide layer 320) on the SOI substrate 300, even before attaching the two semiconductor layers 311, 315 of the SOI substrate 300 to each other. In one embodiment, the insulating layer 313 of the SOI substrate 300 is formed by oxidizing a surface of two semiconductor layers (not shown in the drawings), patterning the oxidized surface of the two semiconductor layers, and then attaching the two semiconductor layers to form the SOI substrate 300.

Next, a mask layer 340 is formed on the second surface 302 of the SOI substrate 300, and the mask layer 340 includes an opening (not shown in the drawing) which is corresponding to the suspended region 210, for forming a cavity in the SOI substrate 300. In one embodiment, a dimension of the opening may be about 100-150 µm, but not limited thereto. The mask layer 340 for example includes silicon oxide or silicon dioxide, but is not limited thereto, and in another embodiment, the mask layer 340 may also include other suitable materials.

Next, as shown in FIG. 7, an etching process such as an anisotropic dry etching process is performed through the mask layer 340, to remove a certain amount of the SOI substrate 300 to a certain depth from a backside (the side of the second surface 302) of the SOI substrate 300 till exposing the oxide layer 320 or the pattern 313b of the insulating layer 313 underneath. In other words, the etching process is performed by using the oxide layer 320 and the insulating layer 313 as etching stop layers, to form a cavity 303 extending between the two surfaces (the first 301 and the second surface 302) through the SOI substrate 300, and corresponding to the suspended region 210 of the interconnection structure 200 on the first surface 301. According, a depth of the cavity 303 may be the same as the thickness T1 of the SOI substrate 300, and an opening 303a of the cavity 303 adjacent to a bottom surface of the suspended region 210 may be accurately controlled by the dimension of the opening 313a, at about 100-150 µm. Meanwhile, a proof mass 305 is formed within the cavity 303, as a portion of the semiconductor layer 315 is blocked and protected by the pattern 313b of the insulating layer 313, as shown in FIG. 7. In this way, the thickness T2 (about 50-100 µm) of the proof mass 305 may be accurately controlled by the thickness T2 of the semiconductor layer 315, and also, the position of the proof mass 305 may also be accurately controlled by the position of pattern 313b within the insulating layer 313.

After that, another etching process, such as an isotropic wet etching process, is performed to simultaneously remove the mask layer 340, the pattern 313b and the exposed oxide layer 320, so that the bottom surface of the suspended region 210 of the interconnection structure 200 may be exposed and in connection with the cavity 303 underneath, as shown in FIG. 8. Accordingly, the proof mass 305 is therefore formed and disposed on the bottom surface of the suspended region 210, and a portion of the oxide layer 320 is sandwiched between the suspended region 210 and the proof mass 305. It is noted that, during the process of performing the another etching process, sidewalls of the oxide layer 320 and the insulating layer 313 may be slightly removed so as to form an undercut portion 321, 313c thereby, as shown in FIG. 8. Following these, the protection layer 330 is also removed to release the suspended structure within the suspended region 210 of the interconnection structure 200, so that one side of the suspended structure within the suspended region 210 may be disconnected with the SOI substrate 300, as shown in FIG. 8. In one embodiment, the protection layer 330 may be simultaneously removed during the aforementioned isotropic wet etching process, but not limited thereto. In another embodiment, the protection layer 330 may also be removed individually through another isotropic wet etching process.

Through above processes, a MEMS device according to the second embodiment of the present disclosure is accomplished. In the present embodiment, the MEMS device includes the suspended structure within the suspended region 210 of the interconnection structure 200, the cavity 303 and the proof mass 305, also to configured as a MEMS piezoelectric accelerometer device, with the piezoelectric layer within the suspended structure capable of vibrating when applying acoustic waves or electrical signals, and with the proof mass 305 capable of adjusting the suspended structure to have a resonant frequency that matches the required acoustic frequency range. It is noteworthy that since the masks for defining the cavity 303 and the proof mass 305 are integrated into the insulating layer 313 of the SOI substrate 300, the cavity size, the proof mass size and the position of the proof mask 305 with in the cavity 303 of the present embodiment are all accurately controlled so as to gain improved sensitivity and sensor accuracy to the MEMS device. Furthermore, the proof mask 305 of the present embodiment also has the same material as the SOI substrate 300 (namely the first semiconductor layer 311 of the SOI substrate 300), and a minimized size, for example being about ¼-⅛ of the thickness T1 of the SOI substrate 300, thus that, the MEMS device with said minimized proof mass 305 in the present disclosure also enables to be applied on TWS earphones, for supplying the voice vibration of microphones.

In summary, the present disclosure provides a MEMS device with a minimized proof mass, in which the proof mass of the MEMS device is formed from a portion of a substrate, so as to obtain the same material and reduced size of the substrate. The size of the proof mass may be about ¼-⅛ of the substrate, so that, the MEMS device with the minimized proof mass in the present disclosure also enables to be applied on TWS earphones, for supplying the voice vibration of microphones.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A true wireless stereo earphone, comprising a micro-electromechanical structure, wherein the micro-electromechanical structure comprises:
   a micro-electromechanical substrate, comprising a first surface and a second surface opposite to the first surface, wherein the micro-electromechanical substrate comprises a first semiconductor layer, an insulating layer and a second semiconductor layer from bottom to top, and the insulating layer is in direct contact with both the first semiconductor layer and the second semiconductor layer to construct a silicon-on-insulator substrate;
   a cavity disposed in the micro-electromechanical substrate, penetrating through the first semiconductor layer, the insulating layer and the second semiconductor layer;
   an interconnection structure disposed on the first surface of the micro-electromechanical substrate, over the cavity, wherein the interconnection structure comprises a suspended region, one of the two opposite ends of the suspended region directly connects to the micro-electromechanical substrate and another one of the two opposite ends of the suspended region disconnect to the micro-electromechanical substrate; and
   a proof mass disposed in the cavity and connected to the suspended region of the interconnection structure, close to and misaligned with the another one of the two opposite ends of the suspended region, the proof mass having a thickness which is ¼-⅛ of a thickness of the micro-electromechanical substrate.

2. The true wireless stereo earphone accordingly to claim 1, wherein the substrate comprises a bulk silicon substrate and a material of the proof mass is the same as a material of the bulk silicon substrate.

3. The true wireless stereo earphone according to claim 1, wherein a material of the proof mass is the same as a material of the second semiconductor layer.

4. The true wireless stereo earphone according to claim 3, wherein the thickness of the proof mass is the same as a thickness of the second semiconductor layer that is disposed above the insulating layer of the silicon-on-insulator substrate.

5. The true wireless stereo earphone according to claim 3, wherein a depth of the cavity is greater than the thickness of the proof mass.

6. The true wireless stereo earphone according to claim 1, wherein the interconnection structure comprises a suspended structure disposed corresponding to the cavity and the proof mass.

7. The true wireless stereo earphone according to claim 1, further comprising an oxide layer disposed between the interconnection structure and the second semiconductor layer, wherein a depth of the cavity is the same as the sum of thicknesses of the first semiconductor layer, the insulating layer, the second semiconductor layer and the oxide layer.

* * * * *